(12) United States Patent
Kim et al.

(10) Patent No.: US 6,502,945 B2
(45) Date of Patent: Jan. 7, 2003

(54) STACK TYPE BACKLIGHT ASSEMBLY, LCD HAVING THE SAME AND ASSEMBLY METHOD THEREOF

(75) Inventors: Jung-Ki Kim, Kyongki-do (KR); Hae-Chun Lee, Kyeongi (KR); Yong-Il Kim, Kyongki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/886,126

(22) Filed: Jun. 22, 2001

(65) Prior Publication Data
US 2002/0001184 A1 Jan. 3, 2002

(30) Foreign Application Priority Data
Jun. 30, 2000 (KR) .......................................... 2000-37239

(51) Int. Cl.⁷ ................................................. G01D 11/28
(52) U.S. Cl. .............................. 362/27; 362/31; 349/64; 349/65
(58) Field of Search ............................... 362/26, 27, 31; 349/64, 65

(56) References Cited

U.S. PATENT DOCUMENTS 5,729,310 A * 3/1998 Horiuchi et al. ............... 349/64
6,108,060 A * 8/2000 Funamoto et al. ............. 362/31
6,154,262 A * 11/2000 Ogura .......................... 349/64

* cited by examiner

Primary Examiner—Stephen Husar
(74) Attorney, Agent, or Firm—McGuireWoods LLP; Hae-Chan Park

(57) ABSTRACT

A backlight assembly, an LCD assembly having the same and an assembly method thereof are disclosed to reduce the assembly time and to improve the efficiency. The backlight assembly comprises: a mold frame having an inner lower surface and side walls normal to the inner lower surface; a reflector plate mounted on the inner lower surface of the mold frame; a light guiding plate disposed on the reflecting plate; a lamp assembly accommodated between one side portion of the light guiding plate and the side wall of the mold frame facing the one side portion of the light guiding plate; a series of diffusion sheets disposed on the light guiding plate; and a pair of fixing frames facing each other, covering an edge of the light guiding plate corresponding to a portion where the lamp assembly is accommodated and the side walls of the mold frame, pressing and fixing the light guiding plate, and being detachably coupled to the mold frame.

11 Claims, 6 Drawing Sheets

STACK TYPE BACKLIGHT ASSEMBLY, LCD HAVING THE SAME AND ASSEMBLY METHOD THEREOF

BACKGROUND OF THE INVENTION

1. Field of the Invention

The present invention relates to a back light assembly, and more particularly, to a back light assembly rendering elements thereof to be orderly stacked and assembled in a receiving space of the mold frame, thereby enhancing the assembly capability and simultaneously finding a failed element easily during the assembly process. Further, the invention relates to an LCD (Liquid Crystal Display) having a back light assembly in which elements are orderly stacked and assembled. Still further, the invention relates to an assembly method of these elements.

2. Description of the Related Art

In these days, as semiconductor fabrication technologies are rapidly advanced, semiconductor devices having an ultra fine line width, for example, switching devices such as the thin film transistors are being developed using such semiconductor fabrication technologies.

Thin film transistors are used in the flat panel display devices such as liquid crystal displays, plasma displays, etc., as well as the memory device such as DRAM (Dynamic Random Access Memory) and CPU (Central Processing Unit).

Especially, as the semiconductor thin film transistors are applied to the display devices, the display devices become lighter in weight, smaller in volume and slimmer in thickness compared with the conventional CRT (Cathode Ray tube) displays.

In order to achieve these less voluminous, light, smaller and slimmer displays, it is necessary to divide a predetermined sized screen into a plurality of fine pixels matched with its resolution and to drive the divided fine pixels selectively. Especially, in LCDs, there are required various important technologies, such as liquid crystal technology using an electric potential forming unit that allows power to be selectively supplied to the fine pixels and an electric field generated by the electric potential forming unit, liquid crystal driving technology for controlling the light transmittance by the liquid crystals, an optical technology for increasing luminance of light passing through the liquid crystal and providing uniform luminance and assembly technology for assembling various elements related to the aforementioned technologies.

Recently, in addition to optimizing these technologies, there are many endeavors for decreasing the width and thickness of the LCD panels by improving the assembly technology such as reducing the number of assembly elements and the number of assembly processes, etc.

In LCD monitors widely used in desktop computers and notebook computers, an LCD panel assembly and a backlight assembly are respectively assembled by separate assembly processes and they are then assembled to each other. Hereinbelow, their assembly processes are described.

First, a mold frame is furnished to simultaneously fix the backlight assembly and the LCD panel assembly. A series of optical sheets, a light guiding plate, a lamp assembly, a reflector plate and a bottom chassis are stacked in order in the mold frame.

Then, the LCD panel assembly is mounted on the mold frame. Thereafter, the backlight assembly, the mold frame and the LCD panel assembly are firmly fixed by the chassis.

However, in the conventional assembly method, where the optical sheets are assembled before the lamp assembly, the contaminated optical sheet may be assembled undetected or the lamp assembly may not operate.

Also, the reverse type may not allow the elements inspected during the LCD inspection, and also increases the assembly time and the LCD size.

SUMMARY OF THE INVENTION

It is therefore an object of the present invention to assemble an LCD assembly more efficiently in an order where the elements of the LCD assembly are placed.

It is another object of the present invention to achieve a slim display module by simplifying the structure of the display module.

It is still another object of the present invention to decrease the time spent in the assembly.

To achieve the above objects and advantages, there is provided a backlight assembly comprising: a mold frame having a receiving space furnished by an inner lower surface and plural side walls normal to the inner lower surface; a reflector plate mounted on the lower surface of the mold frame; a light guiding plate disposed on the reflector plate; a lamp assembly accommodated between one side portion of the light guiding plate and the side walls of the mold frame facing with the one side portion of the light guiding plate; a series of diffusion sheets disposed on the light guiding plate; and a pair of fixing frames facing with each other, covering an edge of the light guiding plate corresponding to an accommodated place where the lamp assembly is accommodated and the side walls of the mold frame, pressing and fixing the light guiding plate and being detachably coupled to the mold frame.

Preferably, the lamp assembly comprises: a reflector mold that is first bent to define an inner space and an outer space and having a constant thickness; a lamp accommodated in the inner space of the bent reflector mold; a lamp holder established at both ends of the reflector mold, for fixing both end portions of the lamp; a reflector sheet attached on a surface of the inner space of the reflector mold; and a lamp wire accommodating groove formed along a length direction of the reflector mold at a face of the outer space of the reflector mold such that a lamp wire for supplying a power to one electrode of the lamp is accommodated.

Preferably, the fixing frame comprises: a body having a constant thickness and which is first bent to define an inner space and an outer space; a pressing protrusion formed along a length direction of the body at a lower face of the inner space of the body and having a selected height; and a guide protrusion formed at both ends of an upper face of the outer space of the body, for guiding an LCD panel when assembling the LCD panel.

Preferably, the body of the fixing frame comprises a plurality of through holes spaced apart by a constant distance and the mold frame comprises a plurality of coupling protrusion formed at the side wall of the mold frame, wherein the fixing frame is coupled to the mold frame by hook-coupling the coupling protrusion of the mold frame to the through holes of the fixing frame.

Preferably, the body comprises a reflector sheet attached at a portion facing with the lamp in the lower face of the inner space of the body.

Preferably, the lower face of the outer space of the body is in contact with the lower surface of the mold frame and the mold frame comprises a mounting groove having a selected depth and formed at the contact portion of the lower surface of the mold frame.

Preferably, the lower face of the outer space of the reflector mold faces with the fixing frame and a reflector sheet is attached to the reflector plate facing with the lower face of the inner space of the reflector mold.

Preferably, the series of diffusion sheets comprises a diffusion sheet that is directly in contact with the light guiding plate and has the largest area than the remaining diffusion sheet.

According to another aspect of the present invention, there is provided a liquid crystal display comprising: a backlight assembly including: a mold frame having a receiving space furnished by plural side walls; a reflector plate mounted on a lower face of the mold frame; a light guiding plate disposed on the reflecting plate; a lamp assembly accommodated between one sided end portion of the light guiding plate and the side walls of the mold frame facing with the one sided end portion of the light guiding plate; a series of diffusion sheets disposed on the light guiding plate; and a pair of fixing frames facing with each other, covering an edge of the light guiding plate corresponding to an accommodated place where the lamp assembly is accommodated and the side walls of the mold frame, pressing and fixing the light guiding plate and being detachably coupled to the mold frame; an LCD panel assembly whose edges facing with each other are established to be overlapped with end portions of the pair of fixing frames on the end portions of the pair of fixing frames; and a chassis integrally coupling the LCD panel assembly and the backlight assembly.

According to still another object of the present invention, there is provided a method for assembling a backlight assembly, comprising steps of: mounting a reflector plate on a lower surface of a mold frame having a receiving space therein; mounting a light guiding plate on the reflector plate; mounting at least one sheet of diffusion plate on the light guiding plate; inserting a stack type lamp assembly into a space between one end portion of the light guiding plate and an inner surface of the mold frame; and coupling a fixing frame and the mold frame such that the fixing frame covers an outer surface of the mold frame and presses an upper surface of the light guiding plate.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein.

Hereinafter, a liquid crystal display having a stack type assembly structure and an assembly method thereof according to the present invention are described with reference to the accompanying drawings.

Figure 1:
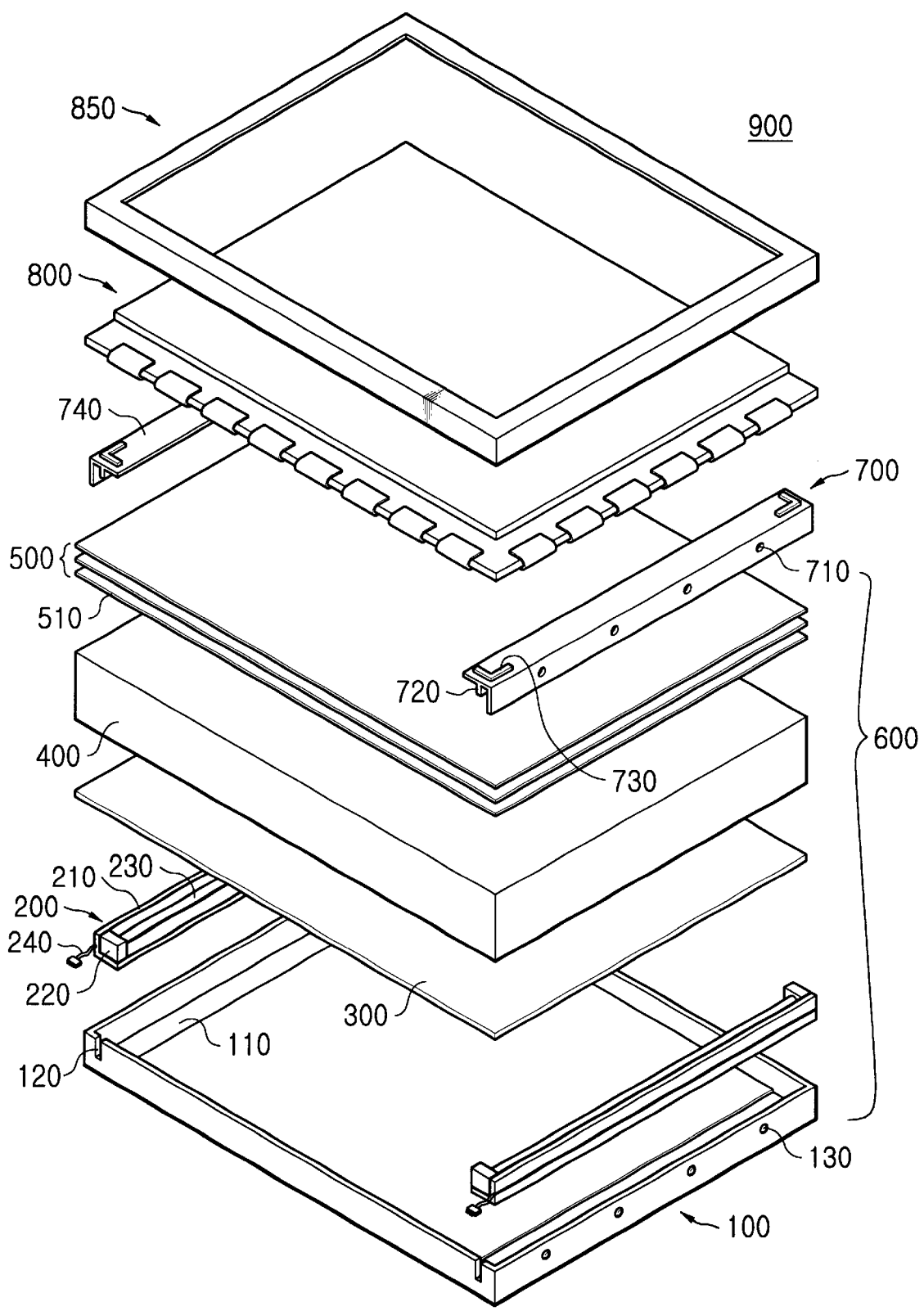
FIG. 1 is a disassembled perspective view of a stack type LCD having a stack type back light assembly unit in accordance with one preferred embodiment of the present invention.

Now referring to FIG. 1, the LCD 900 of the present invention includes a stack type backlight assembly unit 600, a fixing frame 700, an LCD panel assembly 800 and a chassis 850.

The pair of fixing frames 700 are disposed on the stack type backlight assembly unit 600. The LCD panel assembly 800 is disposed on the fixing frame and is coupled to the chassis 850.

The stack type backlight assembly unit 600 includes: a mold frame 100 having a receiving space having side walls; a stack type lamp assembly unit 200 accommodated adjacent to and inside both side walls facing with each other of the mold frame 100; and a reflector plate 300, a light guiding plate 400 and a series of diffusion sheets 500 orderly mounted on the lower face of the mold frame 100 between the stack type lamp assembly units 200.

In more detail, the mold frame 100 has a box shape in which four side walls are formed perpendicular to the lower face of the mold frame 100 along four edges of the lower face. The mold frame 100 has a pair of mounting grooves 110 at lower portions of the receiving space adjacent to the pair of facing side walls to accommodate the stack type lamp assembly unit 200 therein. A slot 120 is formed at the remaining two side walls normal to the previously mentioned two side walls, and it accommodates a lamp wire 240 to be described below.

Figure 2:
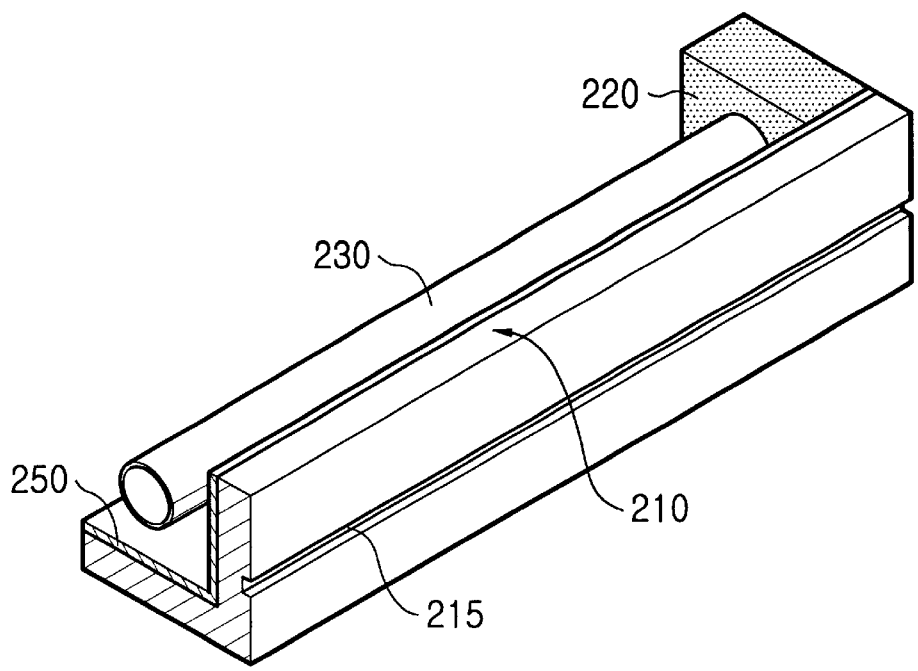
FIG. 2 is a partial sectional perspective view of the stack type lamp assembly of FIG. 1.

FIG. 2 is a partial perspective view of the stack type lamp assembly unit 200. Referring to FIG. 2, the stack type lamp assembly unit 200 includes a reflector mold 210, a lamp holder 220, a lamp 230 and the lamp wire (not shown in FIG. 2).

The reflector mold 210 is made of thin plate first bent to have "L" shape. The lamp 230 is accommodated at an inner space of the bent reflector mold 210 and a reflector sheet 250 having a high light reflection efficiency is attached on the reflector mold 210 of the inner space. Also, the lamp holder 220 is established at both ends of the reflector mold 210 to fix the cold cathode lamp 230.

Meanwhile, at the rear surface of the bent reflector mold 210 is formed a wire groove 215 for accommodating the lamp wire extended from a cold electrode of the cold cathode lamp 230. The wire groove 215 is formed along the length direction of the reflector mold 210 from one end to the other end. The lamp wire accommodated in the wire groove 215 is extracted from one end of the wire groove 215 and is connected to a connector together with the lamp wire extended from a hot electrode of the cold cathode lamp.

The stack type lamp assembly 200 is mounted on the mounting groove 110 of the mold frame 100 such that the outer bottom surface of the reflector mold 210 is in contact with the mounting groove 110 of the mold frame 100. The pair of lamps 230 sitting in the reflector mold 210 face with each other.

Thus, the use of the L-shaped reflector mold 210 allows the light guiding plate 400 to be stack-coupled on the reflector mold 210.

According to the aforementioned embodiment of the present invention, the stack type lamp assembly unit 200 is assembled by preferentially mounting the L-shaped reflector mold 210 on the mounting groove 110 of the mold frame 100 and thereafter mounting the reflector plate 300, the light guiding plate 400 and the series of diffusion sheets in the named order on the lower surface of the mold frame 100 between the L-shaped reflection mold 210. As a result, the assembly process is simplified, improving the assembly efficiency.

The diffusion sheets 500 preferably consist of three sheets. Among the three diffusion sheets, the lowermost diffusion sheet 510 directly contacting with the light guiding plate 400 has an area slightly larger than the remaining two diffusion sheets.

Figure 3:
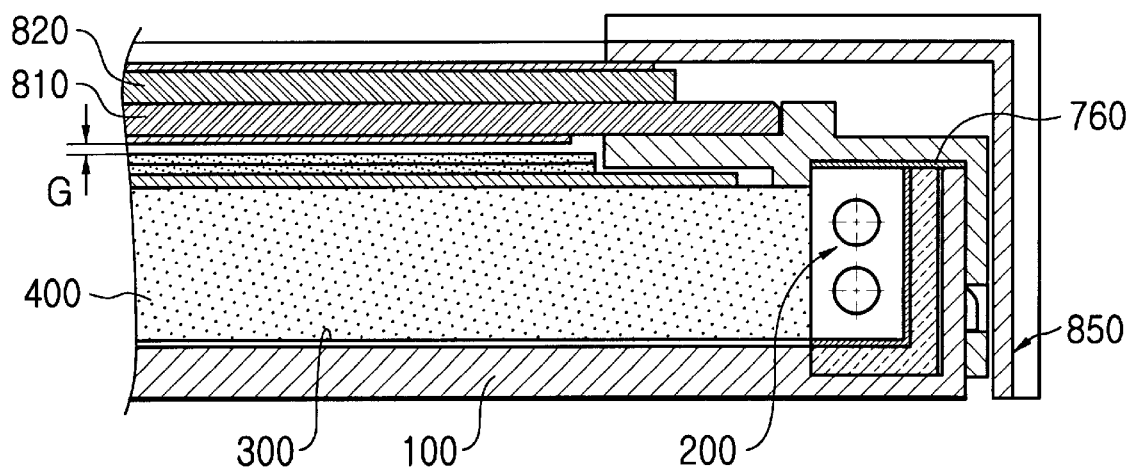
FIG. 3 is a sectional view taken along the ordinate of the assembled LCD of FIG. 1.

FIG. 3 is a partial sectional view taken along the ordinate of the assembled LCD of FIG. 1.

Referring to FIGS. 1 and 3, the reflector plate 300, the stack type lamp assembly 200, the light guiding plate 400 and the diffusion sheets 500 stacked on the mold frame 100 are limited to the horizontal movement but they are not limited to the vertical movement, i.e., they are movable along the vertical direction by external conditions. To restrict the vertical movements of the reflector plate 300, the stack type lamp assembly 200, the light guiding plate 400 and the diffusion sheets 500, the pair of frames 700 facing with each other are applied to the assembly of the LCD.

The fixing frame 700 includes a body that is first bent and has a reverse shape of the letter "L". A plurality of, preferably at least two cylindrical grooves 710 having a constant interval are formed at the outer surface of the fixing frame 700 along the length direction of the fixing frame 700. A pressing protrusion 720 for pressing the upper surface of the light guiding plate 400 is formed at the inner upper surface of the fixing frame 700 from one end to the other end of the fixing frame 700 along the length direction of the fixing frame 700. Also, a guide protrusion 730 having a shape corresponding to the corner of the LCD is formed at both end portions of the outer upper surface of the fixing frame 700.

Thus, the pair of separate fixing frames 700 press the both ends of the light guiding plate 400 and thereby it becomes possible to fabricate the fixing frame 700 thinner. In other words, when fabricating the fixing frame in a ring shape by an injection molding, it is difficult to change a minimum thickness of the fixing frame 700 due to the distortion of the fixing frame 700 and therefore the minimum thickness of the fixing frame 700 is limited to a predetermined value. However, since the present invention uses the pair of separate fixing frames 700, although the fixing frames 700 are fabricated thinner, the distortion of the fixing frames is rare. As a result, the fixing frame 700 can be made as thin as possible, decreasing the weight of the fixing frame 700 by half.

Also, the thinly fabricated fixing frames help to minimize an interval "G" between the LCD panel assembly 800 and the diffusion sheets 500 as shown in FIG. 3, which improves optical characteristics.

The bent side portion of the fixing frame 700 is coupled to the side portion of the mold frame 100. To this end, coupling protrusions 130 having the same number with that of the cylindrical grooves 710 are formed at the side portion of the mold frame 100. The coupling protrusions 130 of the mold frame 100 are hook-coupled to the cylindrical grooves 710 of the fixing frames 700.

In order to minimize loss of light beams from the lamp 230, it is desirous to attach a reflector sheet 760 on the inner surface of the fixing frame 700 corresponding to the lamp 230 such that the light beams generated from the lamp 230 are effectively reflected by the reflector sheet 760 without leaking the light beams and are then incident into the light guiding plate 400.

Thus, in a state the cylindrical groove 710 of the fixing frame 700 is coupled to the coupling protrusion 130 of the mold frame 100, the LCD panel assembly 800 is guided by the guide protrusion 730 to easily assemble with the fixing frames 700.

As well known, the LCD panel assembly 800 includes an LCD panel having a TFT substrate 810 as the lower substrate, a color filter substrate 820 as an upper substrate, and a liquid crystal (not shown) interposed between the TFT substrate 810 and the color filter substrate 820. The TFT substrate includes a plurality of pixel electrodes made in a matrix configuration and having as many pixels as three times of the resolution, a plurality of thin film transistors (TFTs) connected to respective pixel electrodes, for selectively switching the pixel electrodes, gate lines connected to gate electrode of the TFTs and to which a gate voltage for switching the TFTs is applied, and data lines connected to source or drain electrode of the TFTs and in which image data signals are applied. The LCD panel also includes a driving unit for supplying a power to the TFTs and at the same time turning on/off the TFTs at a selected timing.

Thus, when the LCD panel assembly 800 having the above described construction is guided by the guide protrusions 730 of the fixing frames 700 and is mounted on the fixing frames 700, the chassis 850 having a rectangular ring shape is mounted on the LCD panel assembly 800 and is coupled to the LCD panel assembly 800.

Figure 4:
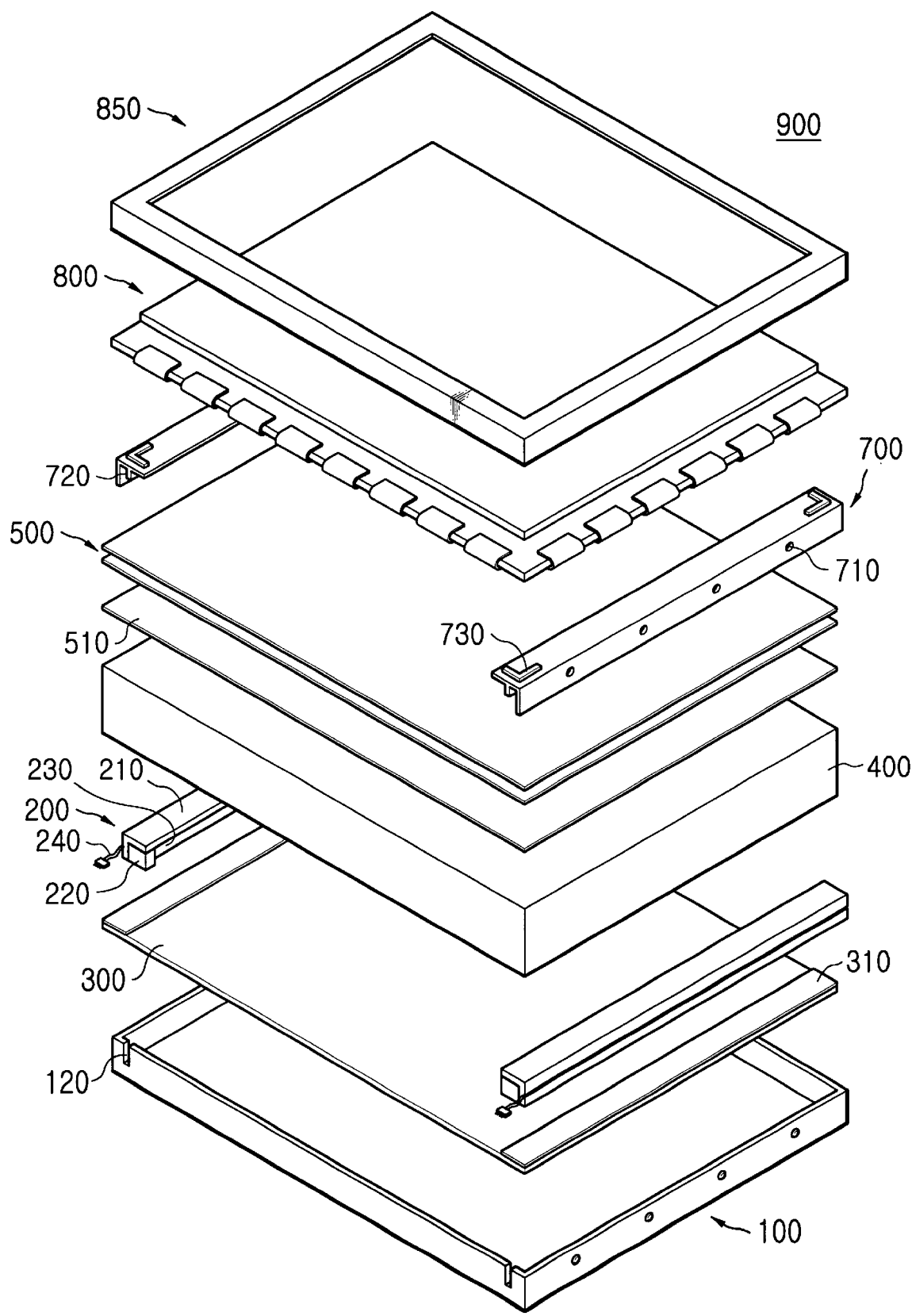
FIG. 4 is a partial disassembled perspective view of a stack type LCD having a stack type back light assembly unit in accordance with another preferred embodiment of the present invention.

FIG. 4 is a disassembled perspective view of a stack type LCD having a stack type back light assembly unit in accordance with another preferred embodiment of the present invention.

Referring to FIG. 4, a reflector plate 300 is mounted on the lower surface of an inner space bounded by four side walls of a mold frame 100. A reflector sheet 310 having high reflection efficiency is attached on both ends of the upper surface of the reflector plate 300. A reflector mold 210 is first bent. However, unlike FIG. 1, the reflector mold 210 does not have the shape of the letter "L" but has a shape of the reversed letter "L". A lamp 230 is accommodated into an inner space of the fixing frame 210. Also, a lamp holder 220 is established at both ends of the reflector mold 210 to fix the cold cathode lamp 230.

Meanwhile, at the rear surface of the bent reflector mold 210 is formed a wire-groove for accommodating a lamp wire 240 extended from a cold electrode of the cold cathode lamp 230. The wire groove is formed along the length direction of the reflector mold 210 from one end to the other end. The lamp wire accommodated in the wire groove is extracted from one end of the wire groove 215 and is connected to a connector together with the lamp wire extended from a hot electrode of the cold cathode lamp.

In the backlight assembly of FIG. 4, it is noted that the lamp 230 is surrounded by the fixing mold 210 and the reflector sheet 310 except a portion facing with side walls of the light guiding plate 400 and the mold frame 100 does not have the mounting groove mentioned in the embodiment of FIG. 1.

FIGS. 5, 6, 7, 8, 9, 10 and 11 are sectional views illustrating an assembly method of the LCD shown in FIG. 4 in accordance with another preferred embodiment of the present invention.

Figure 5:
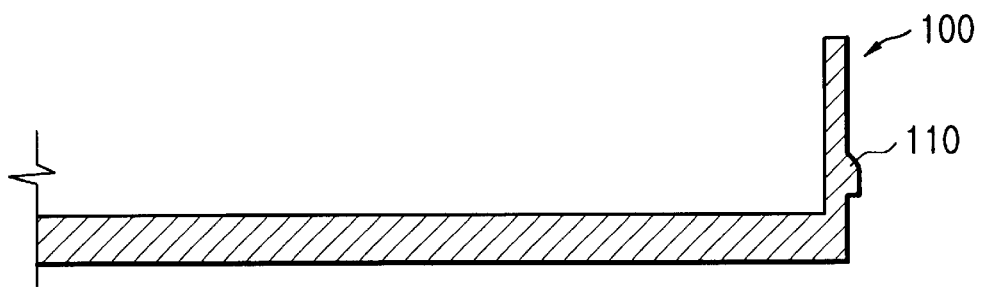
FIGS. 5, 6, 7, 8, 9, 10 and 11 are sectional views illustrating an assembly method in accordance with another preferred embodiment of the present invention.
Figure 6:
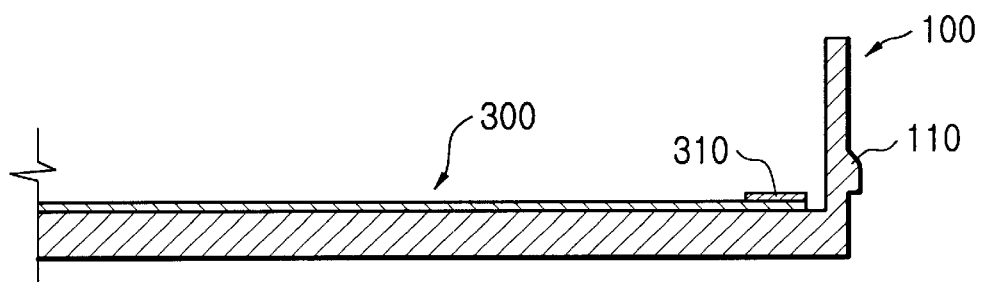

Referring to FIG. 5, the mold frame 100 is placed on a die of an assembly table such that its open lower surface is placed upward. Thereafter, the reflector plate 300 having the reflector sheet 310 attached on both ends of the upper surface of the reflector plate 300 is mounted on the lower surface of the mold frame 100 as shown in FIG. 6. Here, the reflector sheet 310 is sufficiently thin and has the same width and thickness through the entire surface of the reflector sheet 310.

Figure 7:
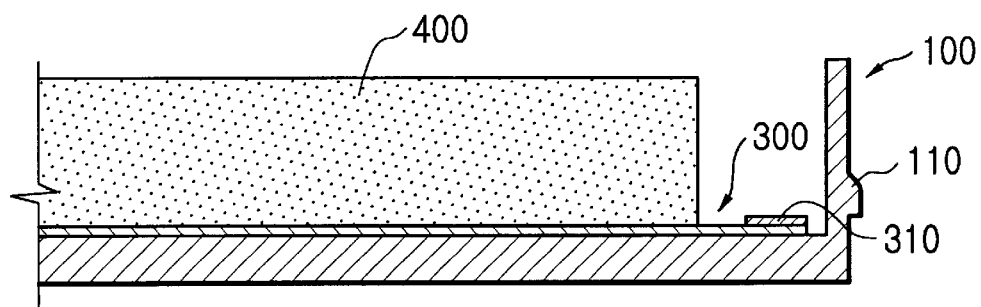

Referring to FIG. 7, the light guiding plate 400 is mounted on the reflector plate 300 between the pair of reflector sheets 310. Here, the light guiding plate 400 has an area smaller than an area of the reflector plate 300. This is because the lamp assembly unit 200 is accommodated into the space between side surface portions of the light guiding plate 400 and the side walls of the mold frame 100.

Figure 8:
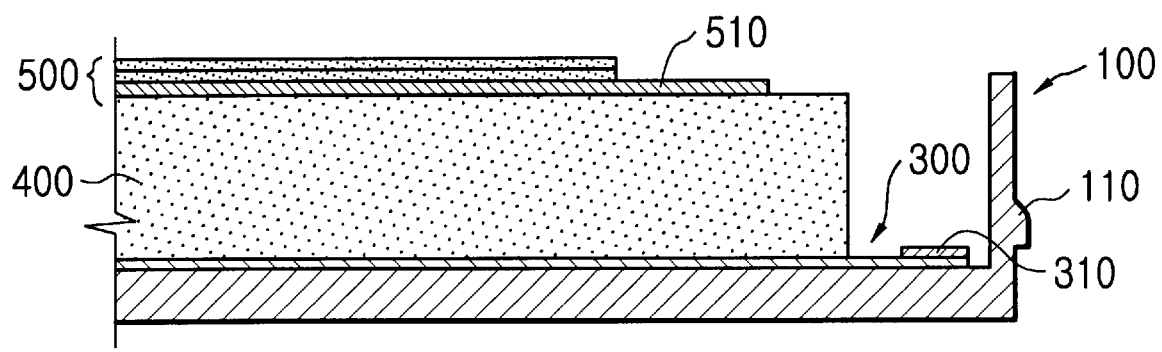

After mounting the light guiding plate 400 on the reflector plate 300, the diffusion sheets are mounted on the light guiding plate 400 as shown in FIG. 8. The diffusion sheets preferably consist of three sheets. Among the three diffusion sheets, the lowermost diffusion sheet 510 directly contacting the light guiding plate 400 has an area slightly larger than the remaining two diffusion sheets.

Figure 9:
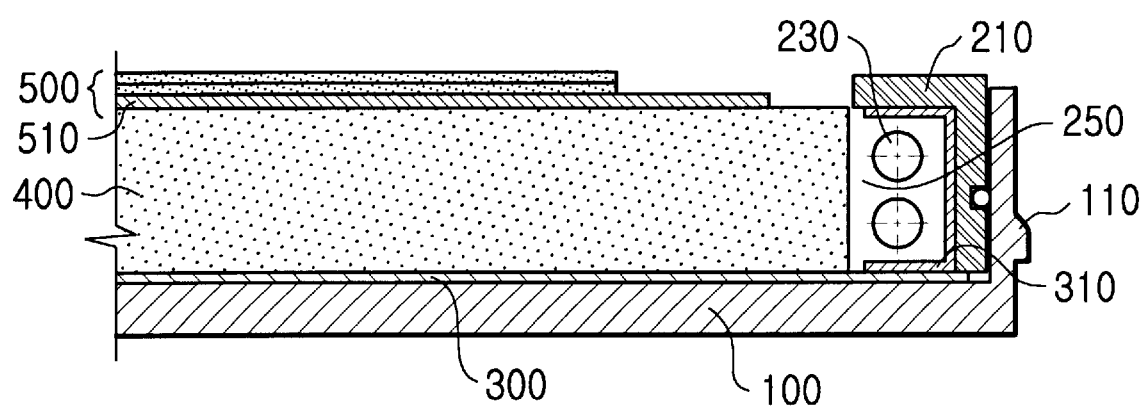
Figure 10:
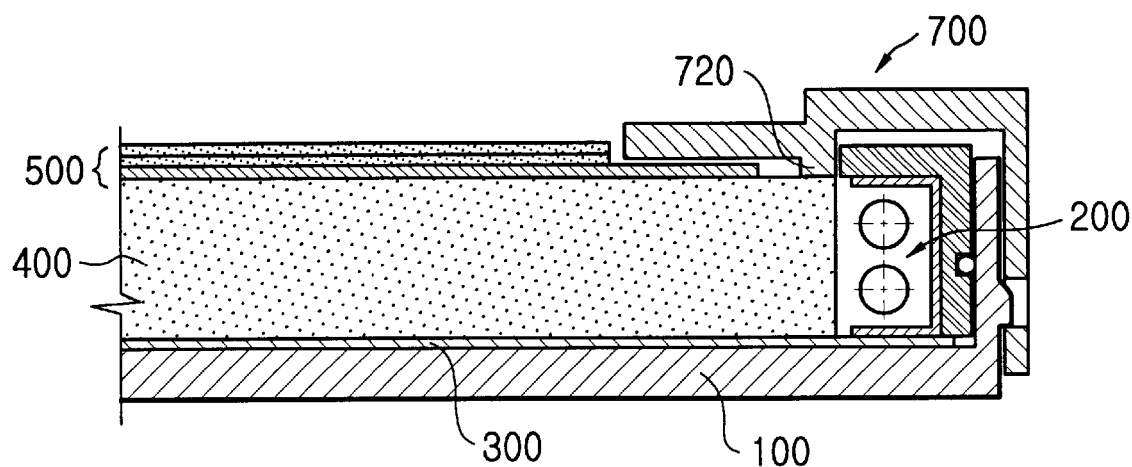

Referring to FIG. 9, the stack type lamp assembly 200 shown in FIG. 4 is assembled into the space between side surface portions of the light guiding plate 400 and the side walls of the mold frame 100.

Thus, when the lamp assembly unit 200 is accommodated into the mold frame 100, a pair of separate fixing frames 700 are assembled to cover both edges of the light guiding plate 400 and the outer surface of the side wall of the mold frame 100. As described above, the fixing frame 700 is coupled to the mold frame 100 by hook-coupling the cylindrical grooves 710 of the fixing frames 700 and the coupling protrusions 110 of the mold frame 100.

Here, the pressing protrusion 720 of the fixing frame 700 fixes the reflector mold 210 of the stack type lamp assembly unit 200 as well as presses the upper surface of the light guiding plate 400.

Figure 11:
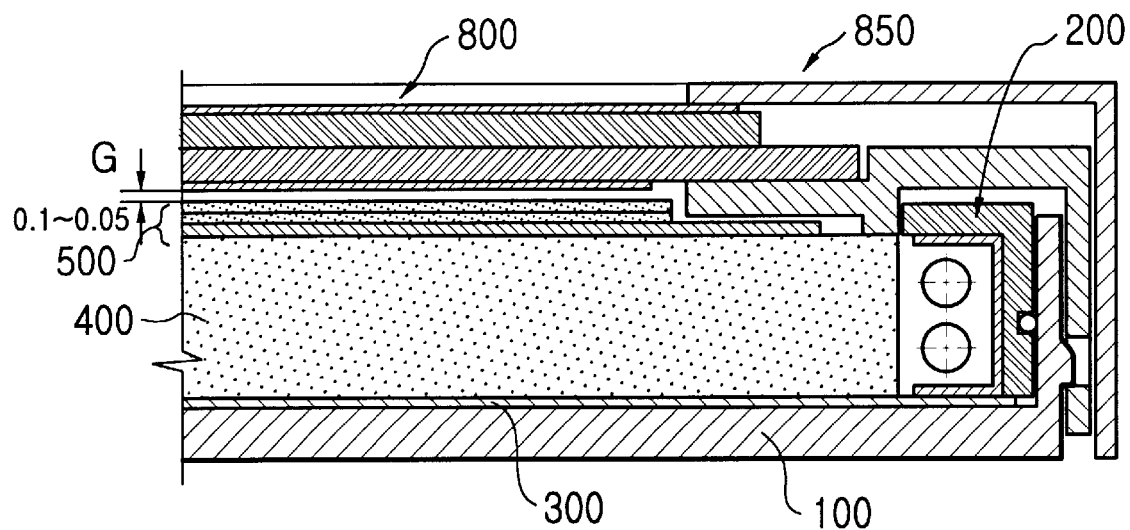

Referring to FIG. 11, in a state the LCD panel assembly 800 having the previously described construction is guided by the guide protrusions 730 of the fixing frames 700 and is mounted on the fixing frames 700, the chassis 850 is coupled to the LCD panel assembly 800 and the mold frame 100 and the assembly process is completed.

Although the above embodiments have been described with reference to liquid crystal displays comprising the mold frame, the reflector plate, the stack type lamp assembly unit, the diffusion sheet, the LCD panel assembly and the chassis, it is also possible to further establish a metal bottom chassis having a shape corresponding to the lower surface of the mold frame on the lower surface of the mold frame, which cools the lamp assembly unit generating a large amount of heat.

As described above, the present invention allows all elements of an LCD panel assembly to be assembled depending on their stacked order, thereby reducing the assembly time and improving the assembly efficiency remarkably. In addition, it is possible to confirm a failure of all elements during the assembly process, thereby enhancing the productivity of the assembly and the fabrication yield, and decreasing the fabrication cost of LCD products.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

What is claimed is:

1. A backlight assembly, comprising:
   a mold frame having a receiving space formed by an inner lower surface and side walls normal to the inner lower surface;
   a reflector plate mounted on the inner lower surface of said mold frame;
   a light guiding plate disposed on said reflector plate;
   a lamp assembly accommodated between one end portion of said light guiding plate and the side walls of the mold frame facing the one end portion of the light guiding plate;
   a series of diffusion sheets disposed on said light guiding plate; and
   a pair of fixing frames facing each other, covering an edge of the light guiding plate corresponding to where the lamp assembly is accommodated and the side walls of the mold frame, pressing and fixing the light guiding plate and being detachably coupled to the mold frame.

2. The backlight assembly of claim 1, wherein said lamp assembly comprises:
   a reflector mold that is first bent to define an inner space and an outer space and having a constant thickness;
   a lamp accommodated into the inner space of said reflector mold;
   a lamp holder established at both ends of the reflector mold, for fixing both end portions of said lamp;
   a reflector sheet attached on the inner surface of the inner space of said reflector mold; and
   a lamp wire groove formed along a length direction of the reflector mold at a face of the outer space of the reflector mold such that a lamp wire for supplying a power to one electrode of the lamp is accommodated.

3. The backlight assembly of claim 1, wherein the fixing frame comprises:
   a body having a constant thickness and bent to define an inner space and an outer space;
   a pressing protrusion formed along a length direction of the body at a lower face of the inner space of the body and having a selected height; and
   a guide protrusion formed at both ends of an upper face of the outer space of the body, for guiding an LCD panel when assembling the LCD panel.

4. The backlight assembly of claim 3, wherein the body of the fixing frame comprises a plurality of through holes spaced apart by a constant distance and the mold frame comprises a plurality of coupling protrusions formed at the side wall of the mold frame, and
   wherein the fixing frame is coupled to the mold frame by hook-coupling the coupling protrusion of the mold frame to the through holes of the fixing frame.

5. The backlight assembly of claim 3, wherein the body comprises a reflector sheet attached at a portion facing the lamp in the lower face of the inner space of the body.

6. The backlight assembly of claim 3, wherein the lower face of the outer space of the body is in contact with the lower surface of the mold frame and the mold frame comprises a mounting groove having a selected depth and formed at the contact portion of the lower surface of the mold frame.

7. The backlight assembly of claim 2, wherein a lower face of the outer space of the reflector mold faces the fixing frame and the reflector sheet is attached to the reflector plate facing with the lower face of the inner space of the reflector mold.

8. The backlight assembly of claim 1, wherein the series of diffusion sheets comprises a diffusion sheet that is directly in contact with the light guiding plate and has larger area than the remaining diffusion sheet.

9. A liquid crystal display, comprising:
- a backlight assembly including: a mold frame having a receiving space formed by side walls; a reflector plate mounted on a lower face of the mold frame; a light guiding plate disposed on the reflecting plate; a lamp assembly accommodated between one end portion of the light guiding plate and the side walls of the mold frame facing with the one end portion of the light guiding plate; a series of diffusion sheets disposed on the light guiding plate; and a pair of fixing frames facing with each other, covering an edge of the light guiding plate corresponding to where the lamp assembly is accommodated and the side walls of the mold frame, pressing and fixing the light guiding plate and being detachably coupled to the mold frame;
- an LCD panel assembly whose edges facing each other overlap end portions of the pair of fixing frames on the end portions of the pair of fixing frames; and
- a chassis integrally coupling the LCD panel assembly and the backlight assembly.

10. A method for assembling a backlight assembly, comprising steps of:
- mounting a reflector plate on a lower surface of a mold frame having a receiving space;
- mounting a light guiding plate on the reflector plate;
- mounting at least one sheet of diffusion plate on the light guiding plate;
- inserting a stack type lamp assembly into a space between one end portion of the light guiding plate and an inner surface of the mold frame; and
- coupling a fixing frame and the mold frame such that the fixing frame covers an outer surface of the mold frame and presses an upper surface of the light guiding plate.

11. The method of claim 10, wherein the fixing frame comprises a plurality of through holes and the mold frame comprises a plurality of coupling protrusions, wherein the fixing frame is coupled to the mold frame by coupling the coupling protrusions of the mold frame to the through holes of the fixing frame.

\* \* \* \* \*

UNITED STATES PATENT AND TRADEMARK OFFICE
CERTIFICATE OF CORRECTION

PATENT NO. : 6,502,945 B2
DATED : January 7, 2003
INVENTOR(S) : Jung-Ki Kim et al.

It is certified that error appears in the above-identified patent and that said Letters Patent is hereby corrected as shown below:

<u>Title page,</u>
Item [75], Inventors, change "Hae-Chun Lee" to -- Hee-Chun Lee --.

Signed and Sealed this

Third Day of June, 2003

JAMES E. ROGAN
*Director of the United States Patent and Trademark Office*